United States Patent
Schulze zur Wiesche et al.

(10) Patent No.: US 9,802,554 B1
(45) Date of Patent: Oct. 31, 2017

(54) EXTERIOR TRIM FOR A MOTOR VEHICLE

(71) Applicant: Dura Automotive Holdings U.K., Ltd, Birmingham (GB)

(72) Inventors: Jochen Schulze zur Wiesche, Köln (DE); Axel Nüsken, Altena (DE); Jan Stegemann, Neuenrade (DE)

(73) Assignee: DURA Automotive Holdings U.K. Ltd., Castle Vale, Birmingham (GB)

( * ) Notice: Subject to any disclaimer, the term of this patent is extended or adjusted under 35 U.S.C. 154(b) by 0 days.

(21) Appl. No.: 15/153,377

(22) Filed: May 12, 2016

(51) Int. Cl.
*B60R 13/04* (2006.01)
*B60R 13/02* (2006.01)
*B60R 25/23* (2013.01)
*B60R 25/24* (2013.01)
*B60R 16/023* (2006.01)

(52) U.S. Cl.
CPC .............. *B60R 13/04* (2013.01); *B60R 13/02* (2013.01); *B60R 16/023* (2013.01); *B60R 25/23* (2013.01); *B60R 25/24* (2013.01); *B60Y 2410/122* (2013.01)

(58) Field of Classification Search
CPC ....... B60R 25/23; B60R 25/24; B60R 25/252; B60R 13/02; B60R 13/0235; B60R 13/0243; B60R 13/025; B60R 13/04; B60R 2013/0287; B60R 2011/0022
See application file for complete search history.

(56) References Cited

U.S. PATENT DOCUMENTS

| | | | | |
|---|---|---|---|---|
| 8,400,265 | B2* | 3/2013 | Sarioglu | E05B 17/10 313/510 |
| 2002/0073518 | A1* | 6/2002 | Chesson | B60J 5/0411 24/455 |
| 2004/0090767 | A1* | 5/2004 | Hou | B60Q 1/323 362/84 |
| 2009/0160529 | A1* | 6/2009 | Lamborghini | B60K 37/06 327/517 |
| 2010/0296303 | A1* | 11/2010 | Sarioglu | E05B 17/10 362/487 |
| 2012/0032463 | A1* | 2/2012 | Gerndorf | B60R 11/0235 296/1.08 |
| 2017/0050616 | A1* | 2/2017 | Liubakka | G07C 9/00309 |
| 2017/0139506 | A1* | 5/2017 | Rodriguez | G06F 3/044 |

* cited by examiner

*Primary Examiner* — Gregory Blankenship
(74) *Attorney, Agent, or Firm* — Robert E. Ford; Steven L. Crane; Raymond J. Vivacqua

(57) ABSTRACT

An exterior trim for a motor vehicle has a body that forms a surface of the exterior trim. The body has an exterior surface and an interior surface, and defines a recess or cut-out. The body has a single undulating wall formed on the interior surface of the body substantially perpendicular to a plane defined by the body, and the single undulating wall at least partially surrounds the recess or cut-out. The exterior trim also includes a human-machine interface (HMI) device disposed at least partially within the recess or cut-out of the body. The HMI device may be used to externally control certain features of the motor vehicle.

21 Claims, 5 Drawing Sheets

US 9,802,554 B1

EXTERIOR TRIM FOR A MOTOR VEHICLE

FIELD

The present invention relates to an exterior trim for a motor vehicle, and in particular, to decorative exterior trim panels for a motor vehicle having a structural wall that supports an electro-mechanical human-machine interface.

BACKGROUND

The statements in this section merely provide background information related to the present disclosure and may or may not constitute prior art.

An exterior trim for a motor vehicle may include a rigid substrate or support member that has an outer decorative surface and an inner support surface. The outer decorative surface may have a high quality finish, such as a glossy surface. A translucent or transparent coating may be applied overtop the outer decorative surface of the substrate. The inner support surface includes flanges and other features to fasten the exterior trim to the motor vehicle and to provide structural rigidity to the substrate. Exterior trim for motor vehicles may include human machine interface (HMI) devices used to externally control certain features of the motor vehicle. To support these HMI devices, the substrate may include additional features, such as a structural wall that supports a display for displaying information to a user or a physical input unit for receiving physical input from a user.

The exterior trim is commonly constructed by injection molding techniques in which the material for the substrate is injected into a preformed mold. Rigidity and strength for the structural walls of a substrate is achieved by molding the structural wall thicker than the thickness of the substrate itself. However, if the structural wall is thicker than the substrate thickness, as the molded material cools, the structural wall may cool at a rate that is different than that of the rest of the substrate. When these cooling rates differ, the structural wall may shrink at a rate that is different than that of the rest of the substrate. The structural wall may then pull on the substrate, causing surface divots to appear on the exterior surface of the substrate. To avoid the creation of surface divots, the structural wall may also be molded thinner than the substrate thickness. However, if the structural wall is molded thinner than the substrate thickness, the rigidity and strength of the substrate may be compromised.

While conventional exterior trims are effective, there is room for improved exterior trims that ensure an appropriate amount of structural rigidity without causing surface divots on the exterior surfaces of exterior trims.

SUMMARY

In accordance with an aspect of the invention, an exterior trim for a motor vehicle is provided. The exterior trim includes a body that forms a surface of the exterior trim. The body has an exterior surface and an interior surface, and the body defines a recess or cut-out. The exterior trim also includes a single undulating wall formed on the interior surface of the body. The single undulating wall is substantially perpendicular to a plane defined by the body. The single undulating wall at least partially surrounds the recess or cut-out.

In another aspect of the present invention, the single undulating wall has a section having a first portion angled with respect to a second portion, a third portion angled with respect to the second portion, and a fourth portion parallel to the second portion.

In another aspect of the present invention, the first portion is connected with the second portion, the second portion is connected to the third portion, and the third portion is connected to the fourth portion.

In another aspect of the present invention, the single undulating wall includes a plurality of sections.

In another aspect of the present invention, the plurality of sections repeat continuously.

In another aspect of the present invention, the body and single undulating wall are injection molded and integral.

In another aspect of the present invention, the exterior surface of the body is planar overtop the single undulating wall.

In another aspect of the present invention, the single undulating wall completely surrounds the recess or cut-out.

In another aspect of the present invention, the body has a first thickness, the single undulating wall has a second thickness, and the first thickness is substantially equal to the second thickness.

In another aspect of the present invention, the exterior surface of the body is a decorative or covering surface that is substantially continuous with an exterior component of the motor vehicle.

In another aspect of the present invention, the exterior surface of the body forms an optically continuous, glossy surface of the exterior trim.

In another aspect of the present invention, a clear coating is disposed over the exterior surface of the body.

In another aspect of the present invention, there is an electrode film in alignment with the recess or cut-out and disposed inwardly of the clear coating.

In another aspect of the present invention, the electrode film is disposed in the recess or cut-out.

In another aspect of the present invention, there is a circuit board that is in electrical contact with the electrode film and is disposed inwardly of the electrode film.

In another aspect of the present invention, there is a backing plate connected to the interior surface of the body inwardly of the circuit board and the electrode film.

In another aspect of the present invention, the backing plate includes a slot that receives the single undulating wall.

In another aspect of the present invention, an exterior trim for a motor vehicle has a body that forms a surface of the exterior trim. The body has a high-finish exterior surface and an interior surface, and the body defines a recess or cut-out. The body also has a single wall formed on the interior surface of the body. The single wall at least partially surrounds the recess or cut-out and has a first thickness. The single wall has a first section defined by a first imaginary plane which is substantially perpendicular to the interior surface, and a second section defined by a second imaginary plane which is substantially perpendicular to the interior surface. The first imaginary plane is offset from the second imaginary plane by an amount substantially equal to the first thickness.

In another aspect of the present invention, the body has a second thickness and the first thickness is substantially equal to the second thickness.

In another aspect of the present invention, a part for a motor vehicle has an injection molded component having a body formed of an opaque material with a high-finish exterior surface and an interior surface. The body defines a recess or cut-out lacking the opaque material and includes a single wall formed on the interior surface of the body. The single wall at least partially surrounds the recess or cut-out and has a first thickness. The single wall has a first section defined by a first imaginary plane which is substantially perpendicular to the interior surface and a second section defined by a second imaginary plane which is substantially perpendicular to the interior surface. The first imaginary plane is offset from the second imaginary plane by an amount substantially equal to the first thickness. The part also has a coating that is at least partially translucent, transparent, or semi-transparent disposed over the exterior surface of the body. The part also has an electrode film disposed in the recess or cut-out and inwardly of the at least partially translucent, transparent, or semi-transparent coating. The part also has a circuit board that is in electrical contact with the electrode film and disposed inwardly of the electrode film. The part also has a backing plate connected to the interior surface of the body inwardly of the circuit board and the electrode film, and the backing plate is in contact with the single wall.

In another aspect of the present invention, the single wall has a height. The height is defined by a third imaginary plane that is substantially parallel to the interior surface.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

Figure 1:
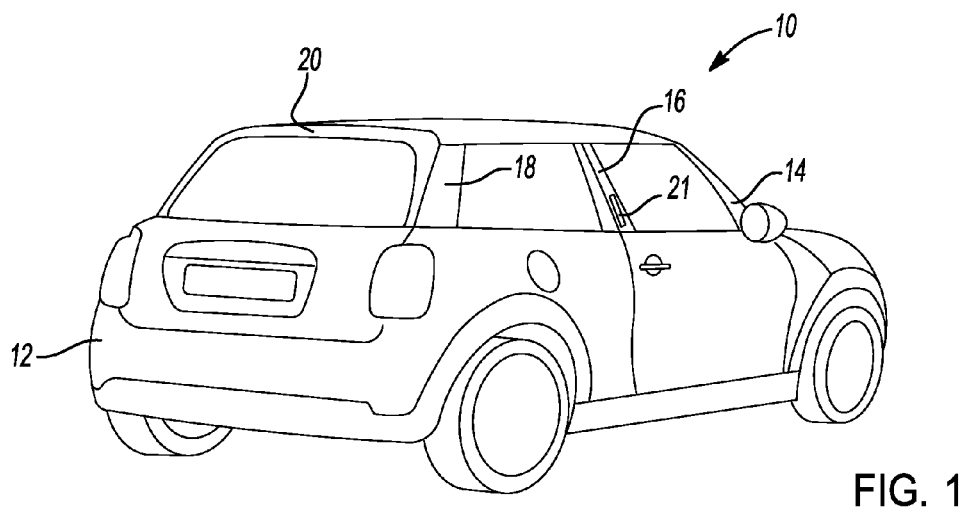
FIG. 1 is a perspective view of an exemplary motor vehicle having exterior trims, according to the principles of the present invention.

Referring to FIG. 1, a plurality of exterior trim parts 10 are depicted on an exemplary motor vehicle 12. The motor vehicle 12 is illustrated as a passenger vehicle, however, the motor vehicle 12 may be any type of motor vehicle 12, including a truck, van, motor home, sport utility vehicle, etc. The plurality of exterior trim parts 10 includes an A-pillar exterior trim 14, a B-pillar exterior trim 16, a C-pillar exterior trim 18, and a spoiler exterior trim 20. The motor vehicle 12 may also include other exterior trim parts 10 including D-pillar trims, side panels, etc. Each of the exterior trim parts 10 forms a portion of the exterior surface or body of the motor vehicle 12. In the example provided, the B-pillar exterior trim 16 includes a human-machine interface (HMI) device 21. However, it should be appreciated that any of the exterior trim parts 10 may include an HMI device.

Figure 2:
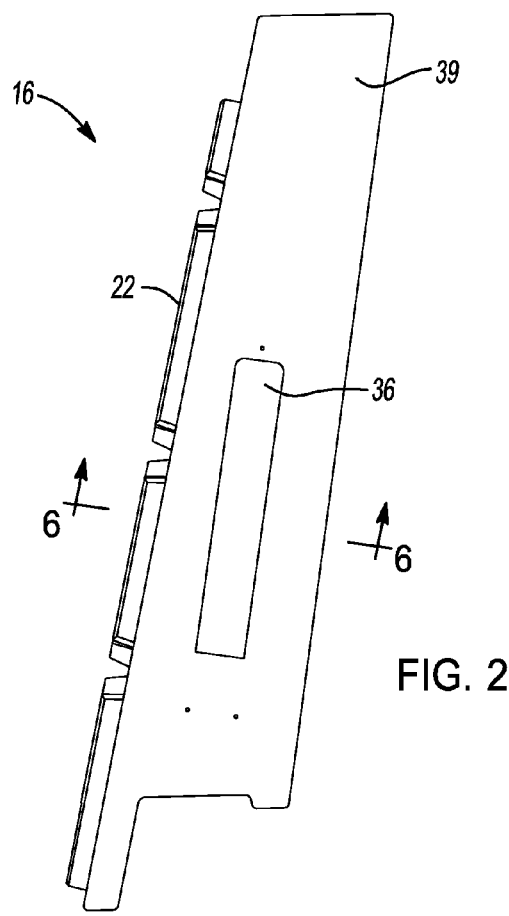
FIG. 2 is a perspective front view of an exterior trim of the motor vehicle, according to the principles of the present invention.
Figure 3:
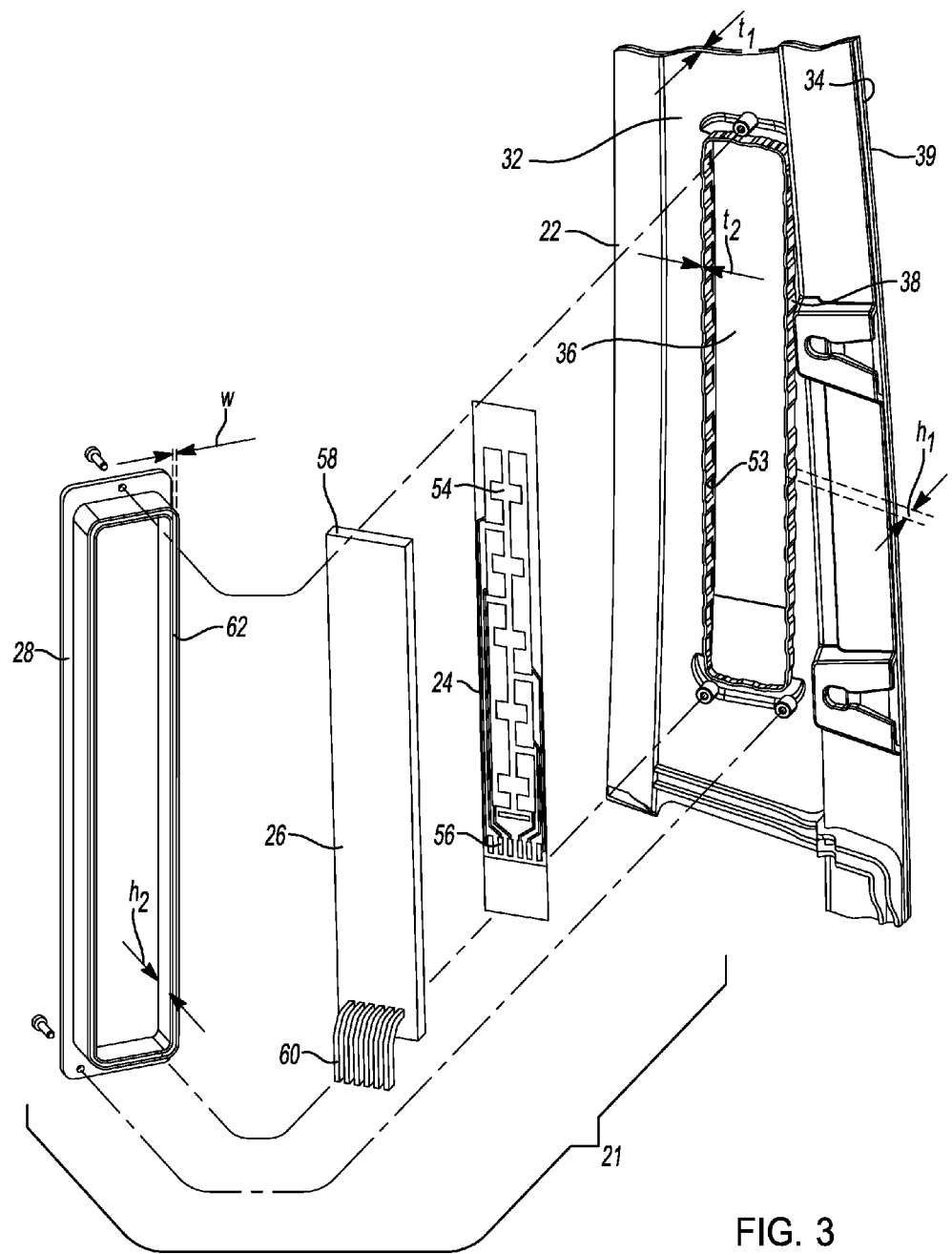
FIG. 3 is an exploded perspective view of the exterior trim of the motor vehicle, according to the principles of the present invention.

Turning now to FIGS. 2 and 3, the exterior trim 16 generally includes a body 22 that supports the HMI device 21. The HMI device 21 includes an electrode film 24 and a circuit board 26 supported by a backing plate 28, as will be described in greater detail below. The body 22 of the exterior trim 16 is formed of a substantially opaque material and is substantially planar with a first thickness "$t_1$". The body 22 includes an interior surface 32 an exterior surface 34 and defines a recess or cut-out 36. The interior surface 32 of the body 22 lies behind the exterior surface 34 of the body 22 relative to the exterior of the motor vehicle 12. The interior surface 32 includes a single undulating wall 38. The interior surface 32 may also include various flanges, fasteners, and other features. The exterior surface 34 of the body 22 is a glossy, optically continuous, divot-free surface. The exterior surface 34 is substantially planar and parallel to the interior surface 32. An exterior coating 39 is disposed overtop the exterior surface 34 of the body 22. At least a portion of the exterior coating 39 is at least partially translucent, transparent or semi-transparent. The exterior coating 39 may be formed of a scratch proof material that provides a glossy, divot-free, optically-continuous surface of the exterior trim 16.

The recess or cut-out 36 is formed through both the interior surface 32 and the exterior surface 34 and traverses the first thickness "$t_1$". Thus, the recess or cut-out 36 is a portion of the body 22 lacking opaque material, and is sized to fit at least a portion of the HMI device 21 there within. The recess or cut-out 36 of the body 22 aligns with the portion of the exterior coating 39 that is at least partially translucent, transparent or semi-transparent.

Figure 4:
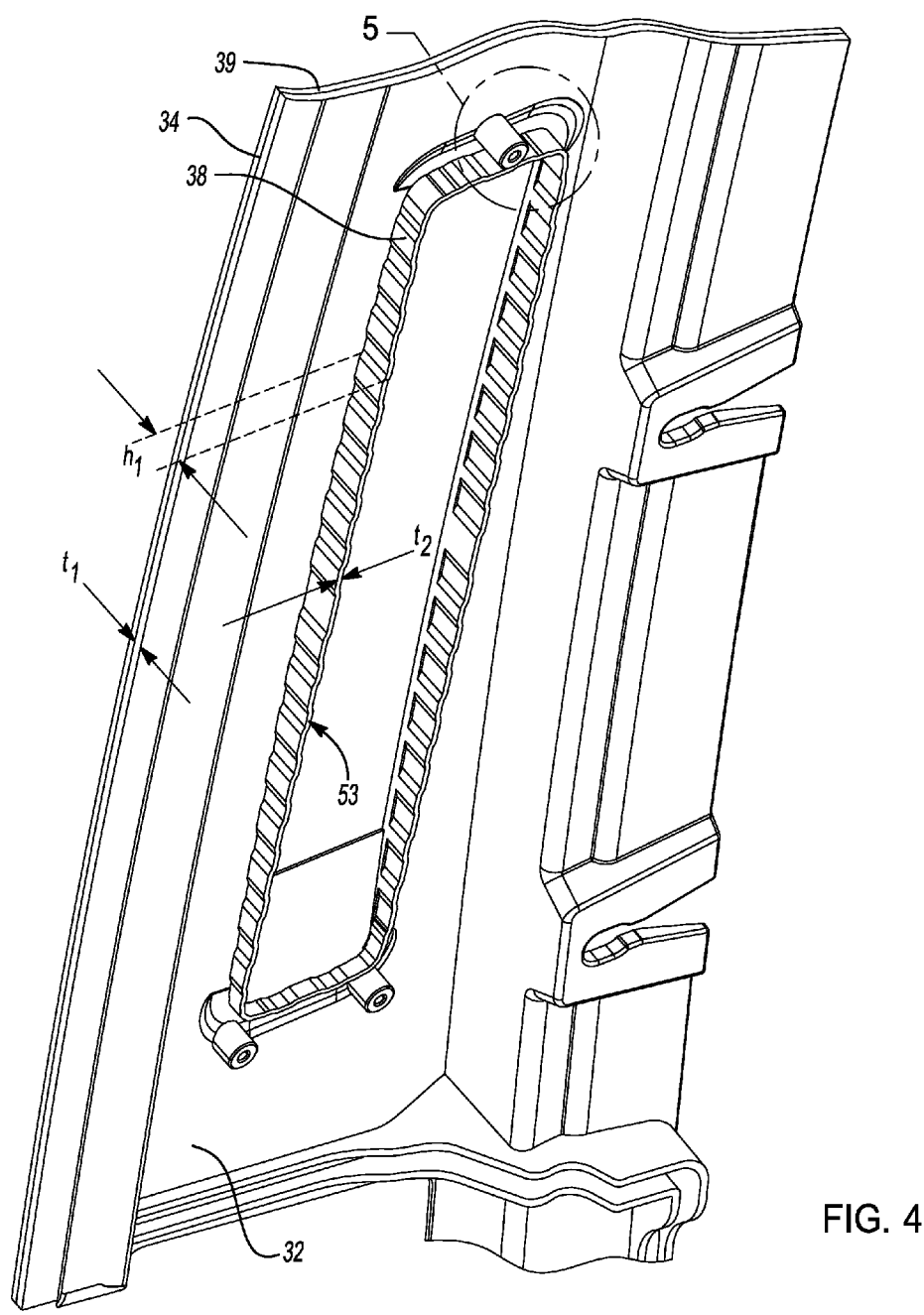
FIG. 4 is a perspective back view of the exterior trim of the motor vehicle, according to the principles of the present invention.
Figure 5:
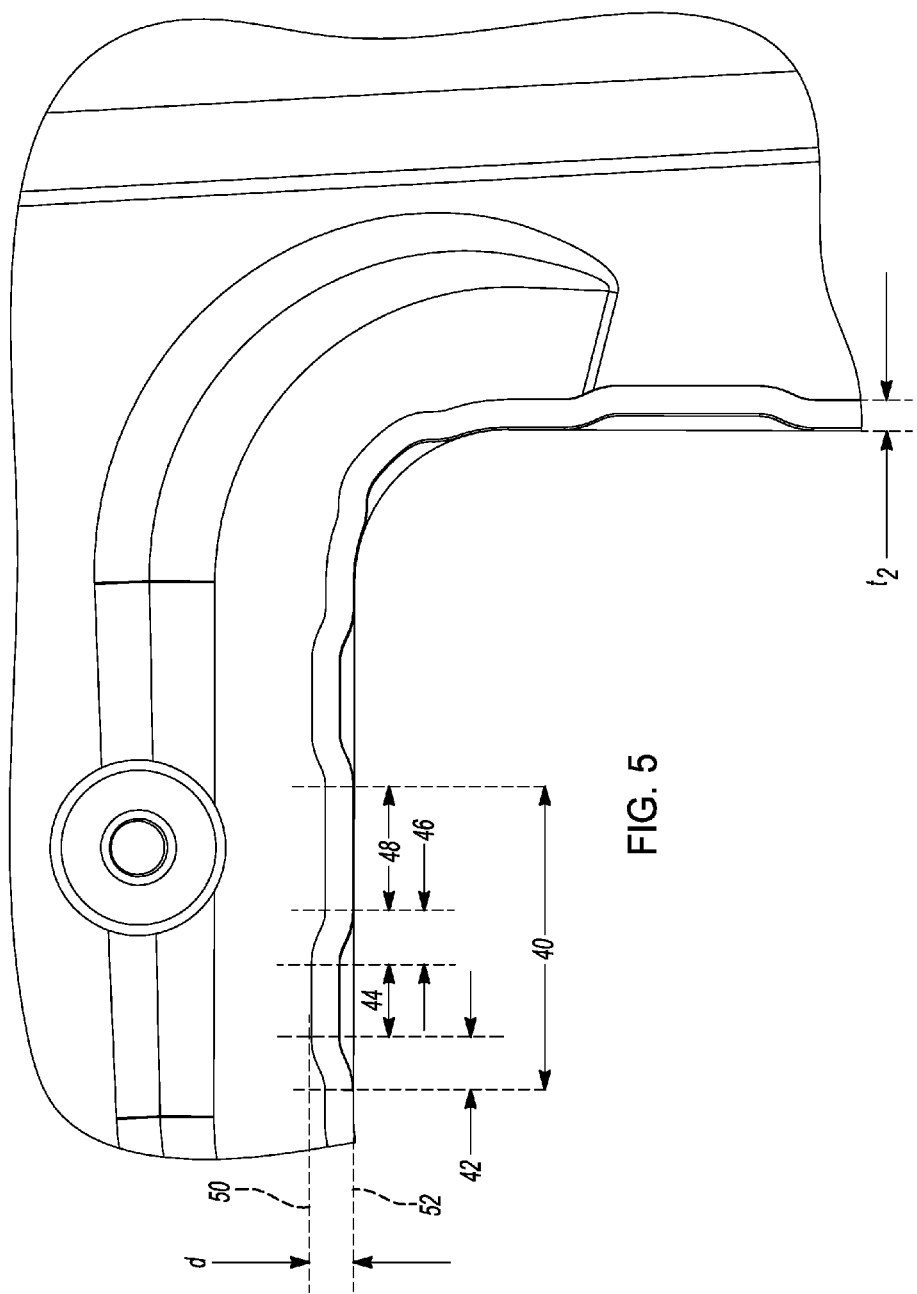
FIG. 5 is a partial top view of a portion of the exterior trim of the motor vehicle, according to the principles of the present invention.

The single undulating wall 38 at least partially surrounds the recess or cut-out 36. The single undulating wall 38 is substantially perpendicular to a plane defined by the body 22. Turning to FIGS. 4 and 5, the single undulating wall 38 has a second thickness "$t_2$" The first thickness "$t_1$" of the body 22 is substantially equal to the second thickness "$t_2$" of the single undulating wall 38. The body 22 and the single undulating wall 38 are integral and injection molded together, and the single undulating wall 38 provides structural rigidity and support to the body 22.

In one aspect, the single undulating wall 38 includes a series of undulations defined by repeating sections 40. The repeating sections 40 form structural gussets that provide structural rigidity to the single undulating wall 38. Each of the repeating sections 40 has a first portion 42 angled with respect to a second portion 44, a third portion 46 angled with respect to the second portion 44, and a fourth portion 48 angled with respect to the third portion 46, and the second portion 44 and fourth portion 48 are parallel. In each section 40 the first portion 42 is connected to the second portion 44, the second portion 44 is connected to the third portion 46, and the third portion 46 is connected to the fourth portion 48. The single undulating wall 38 can have a variety of different configurations without departing from the scope or intent of the disclosure. The undulations of the single undulating wall 38 may follow a smooth wavelike path, or the undulations may take a more block-like or angular path. For example, the single undulating wall 38 could have a design which approximates a plurality of chevrons. Additionally, throughout the span of the single undulating wall 38, the repeating sections 40 may be periodic, or sporadic.

The single undulating wall 38 may be defined by a first imaginary plane 50 and a second imaginary plane 52. The first imaginary plane 50 and the second imaginary plane 52 are perpendicular to the plane defined by the body 22. The first and second imaginary planes 50, 52 are parallel and displaced by a distance "d" that is substantially the same as the first thickness "$t_1$". The first imaginary plane 50 defines a limit of the second portion 44 of the single undulating wall 38 past which the second portion 44 does not extend. The second imaginary plane 52 defines a limit of the fourth portion 48 of the single undulating wall 38 past which the fourth portion 48 does not extend. The single undulating wall 38 also has a height "$h_1$". Height "$h_1$" is defined from the interior surface 34 to an end surface 53 of the single undulating wall 38. The end surface 53 is planar along the path of the single undulating wall 38. Thus, the height "$h_1$" is constant where the body 22 is planar and the height "$h_1$" varies along the path of the single undulating wall 38 where the body 22 is non-planar.

Returning to FIGS. 2 and 3, the HMI device 21 will now be described. The electrode film 24 is in alignment with or disposed within the recess or cut-out 36 of the body 22. In one aspect the electrode film 24 includes a plurality of input/output portions 54 and an electrical connector 56. The electrode film 24 is in direct contact with the exterior coating 39, and is disposed behind the exterior coating 39 relative to the exterior of the motor vehicle 10. The electrode film 24 may be any device for displaying data or receiving tactile input. In one aspect, the electrode input/output portions 54 receive input from a user and transmit the user input through the electrode film 24 to the circuit board 26. Additionally, the electrode film 24 may include a series of light-emitting diodes that emit visible light through the recess or cut-out 36 of the body 22 and through the exterior coating 39 of the exterior trim 16. The electrode film 24 may be a touch-sensitive HMI, such as a keypad, that displays information through or on the exterior surface 34 of the body 22, or on the exterior coating 39 of the exterior trim 16.

The circuit board 26 includes a contact surface 58 and an electrical connector 60. The circuit board 26 is also in alignment with or disposed within the recess or cut-out 36 of the body 22. The circuit board 26 is in electrical communication with the electrode film 24 and is disposed inwardly of the electrode film 24 relative to the exterior coating 39 of the body 22 of the exterior trim 16. The circuit board 26 may be any device that can communicate electronically with the electrode film 24 and with other vehicle systems and circuits to which the exterior trim 16 may be attached.

The backing plate 28 is in physical contact with the electrode film 24, the circuit board 26, and the single undulating wall 38. The backing plate 28 is also in alignment with or disposed at least substantially within the recess or cut-out 36 of the body 22. In one aspect, the backing plate 28 mechanically fastens to the body 22 and retains the circuit board 26 and the electrode film 24 within the recess or cut-out 36 of the body 22. The backing plate 28 may mechanically fasten to and receive the single undulating wall 38 via a slot 62 molded into the backing plate 28.

Figure 6:
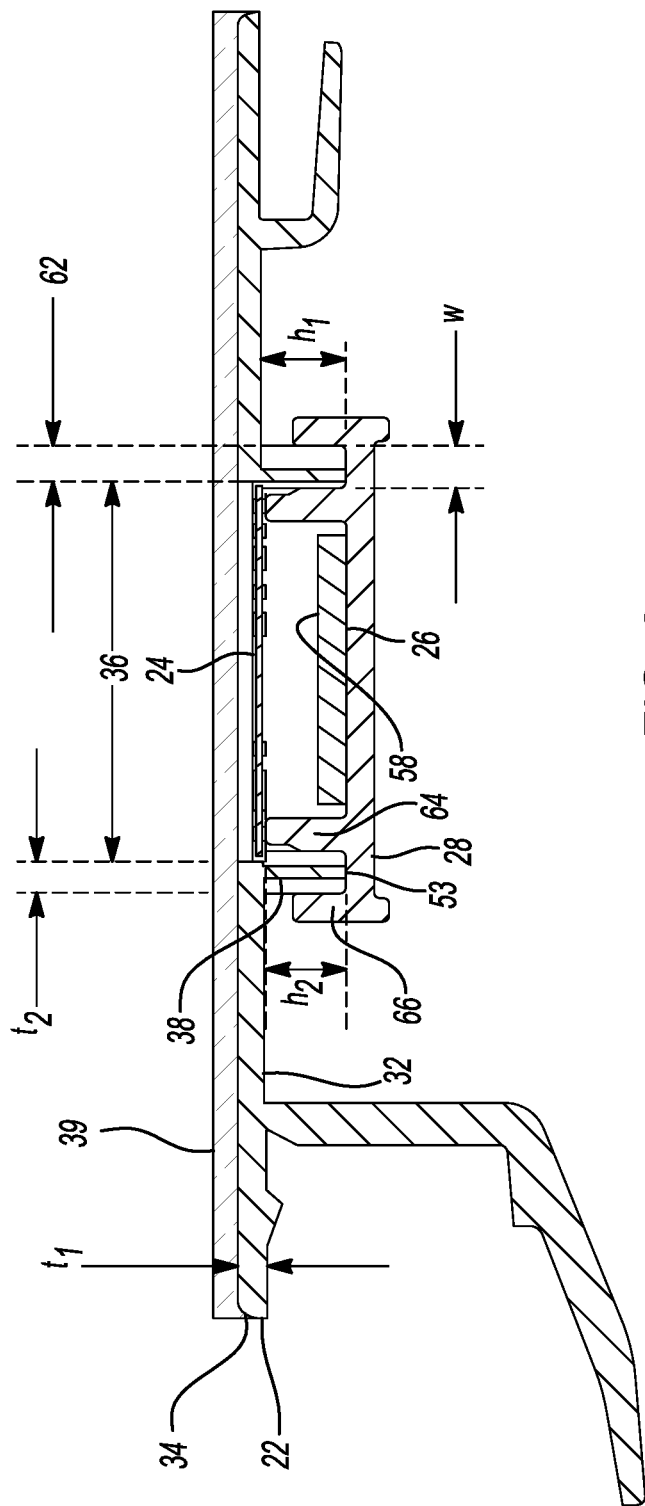
FIG. 6 is a partial cross-sectional view of a portion of the exterior trim of the motor vehicle, according to the principles of the present invention.

With reference to FIG. 6, and with continued reference to FIGS. 3 and 5, the slot 62 of the backing plate 28 has a width "w" defined by the separation between an inner section 64 and an outer section 66 of the slot 62. The outer section 66 substantially traverses a perimeter of the backing plate 28. The inner section 64 is disposed radially inwardly of the outer section 66 of the backing plate 28 and substantially parallels the outer section 66. The slot 62 is configured to receive and retain the single undulating wall 38 of the body 22. The width "w" of the slot 62 is substantially the same as the distance "d" between the first and second imaginary planes 50, 52. In one aspect, the slot inner section 64 has a height "$h_2$" that is substantially the same as the height "$h_1$" of the single undulating wall 38. Because the height "$h_2$" of the slot inner section 64 and the height "$h_1$" of the single undulating wall 38 are substantially the same, the slot inner section 64 extends to the electrode film 24 and causes the electrode film 24 to contact the exterior coating 39. The backing plate 28 is also in contact with and retains the circuit board 26 within the recess or cut-out 36 of the body 22. The circuit board 26 contact surface 58 is in contact with the electrode film 24, and the circuit board electrical connector 60 is in electrical communication with the electrode electrical connector 56.

The HMI device 21 supported by the exterior trim 16 projects information to a user of the motor vehicle 12. The at least partially translucent, transparent, or semi-transparent material of the exterior coating 39 allows the projected information from the electrode film 24 of the HMI device 21 to be displayed to the user. The input/output portions 54 of the electrode film 24 may also receive user inputs. The exterior trim 16 preferably withstands repeated user-imparted inputs to the HMI device 21, including physical stresses, without departing from an original shape. The inclusion of a single undulating wall 38, injection molded together with and integrally formed on the interior surface 32 of the body 22, provides structural rigidity to the exterior trim and prevents the exterior trim 16 from deforming with repeated use. Because the body 22 and single undulating wall 38 are injection molded together, and because the body 22 and the single undulating wall 38 may have differential cooling rates, the first thickness "$t_1$" and second thickness "$t_2$" are substantially the same to prevent deformation of the exterior surface 34 of the exterior trim 16. By preventing physical deformation and heat deformation of the exterior surface 34 of the exterior trim 16, the single undulating wall 38 supports and provides structural rigidity to the exterior surface 34 of the exterior trim 16 so that the exterior surface 34 remains substantially smooth and divot-free. Furthermore, by preventing deformation of the exterior trim 16, the exterior surface 34 remains substantially in contact with the exterior coating 39 which further allows the exterior trim 16 to maintain a substantially smooth, divot-free finish.

The features and components of the present invention described above are merely exemplary in nature. Variations that do not depart from the gist of the invention are intended to be within the scope of the invention. Such variations are not to be regarded as a departure from the spirit and scope of the invention.

What is claimed is:

1. An exterior trim for a motor vehicle comprising:
   a body that forms a surface of the exterior trim, the body having an exterior surface and an interior surface, wherein the body defines a recess or cut-out; and
   a single undulating wall formed on the interior surface of the body substantially perpendicular to a plane defined by the body, wherein the single undulating wall at least partially surrounds the recess or cut-out.

2. The exterior trim of claim 1 wherein the single undulating wall includes a section having a first portion angled with respect to a second portion, a third portion angled with respect to the second portion, and a fourth portion parallel to the second portion.

3. The exterior trim of claim 2 wherein the first portion is connected with the second portion, the second portion is connected to the third portion, and the third portion is connected to the fourth portion.

4. The exterior trim of claim 3 wherein the single undulating wall includes a plurality of sections.

5. The exterior trim of claim 4 wherein the plurality of sections repeat continuously.

6. The exterior trim of claim 1 wherein the body and single undulating wall 38 are injection molded and integral.

7. The exterior trim of claim 6 wherein the exterior surface of the body is planar overtop the single undulating wall.

8. The exterior trim of claim 1 wherein the single undulating wall completely surrounds the recess or cut-out.

9. The exterior trim of claim 1 wherein the body has a first thickness, the single undulating wall has a second thickness, and the first thickness is substantially equal to the second thickness.

10. The exterior trim of claim 1 wherein the exterior surface of the body is a decorative or covering surface that is substantially continuous with an exterior component of the motor vehicle.

11. The exterior trim of claim 1 wherein the exterior surface of the body forms an optically continuous, glossy surface of the exterior trim.

12. The exterior trim of claim 1 further comprising a clear coating disposed over the exterior surface of the body.

13. The exterior trim of claim 12 further comprising an electrode film in alignment with the recess or cut-out and disposed inwardly of the clear coating.

14. The exterior trim of claim 13 wherein the electrode film is disposed in the recess or cut-out.

15. The exterior trim of claim 13 further comprising a circuit board that is in electrical contact with the electrode film and is disposed inwardly of the electrode film.

16. The exterior trim of claim 15 further comprising a backing plate connected to the interior surface of the body inwardly of the circuit board and the electrode film.

17. The exterior trim of claim 16 wherein the backing plate includes a slot that receives the single undulating wall.

18. An exterior trim for a motor vehicle comprising:
a body that forms a surface of the exterior trim, the body having a high-finish exterior surface and an interior surface, wherein the body defines a recess or cut-out; and
a single wall formed on the interior surface of the body, wherein the single wall at least partially surrounds the recess or cut-out and has a first thickness, the single wall having:
a first section defined by a first imaginary plane which is substantially perpendicular to the interior surface; and
a second section defined by a second imaginary plane which is substantially perpendicular to the interior surface, and
wherein the first imaginary plane is offset from the second imaginary plane by an amount substantially equal to the first thickness.

19. The exterior trim of claim 18 wherein the body has a second thickness and the first thickness is substantially equal to the second thickness.

20. A part for a motor vehicle comprising:
an injection molded component having a body formed of an opaque material with a high-finish exterior surface and an interior surface, wherein the body defines a recess or cut-out lacking the opaque material and includes a single wall formed on the interior surface of the body, wherein the single wall at least partially surrounds the recess or cut-out and has a first thickness, the single wall having a first section defined by a first imaginary plane which is substantially perpendicular to the interior surface and a second section defined by a second imaginary plane which is substantially perpendicular to the interior surface, and wherein the first imaginary plane is offset from the second imaginary plane by an amount substantially equal to the first thickness;
a coating that is at least partially translucent, transparent, or semi-transparent disposed over the exterior surface of the body;
an electrode film disposed in the recess or cut-out and inwardly of the at least partially translucent, transparent, or semi-transparent coating;
a circuit board that in electrical contact with the electrode film and disposed inwardly of the electrode film; and
a backing plate connected to the interior surface of the body inwardly of the circuit board and the electrode film, wherein the backing plate is in contact with the single wall.

21. The part of claim 20 wherein the single wall has a height wherein the height is defined by a third imaginary plane that is substantially parallel to the interior surface.

* * * * *